United States Patent Office 3,639,352
Patented Feb. 1, 1972

---

3,639,352
POLYESTERS OF IMPROVED DYEABILITY AND LIGHT FASTNESS
Kanji Katsuura and Keishiro Igi, Kurashiki, Japan, assignors to Kurashiki Rayon Co., Ltd., Kurashiki, Okayama, Japan
No Drawing. Filed Nov. 25, 1969, Ser. No. 879,945
Claims priority, application Japan, Nov. 26, 1968, 43/86,560; Mar. 24, 1969, 44/22,626, 44/22,627
Int. Cl. C08g 17/14
U.S. Cl. 260—75 P                            5 Claims

ABSTRACT OF THE DISCLOSURE

Modified film- or fiber-forming polyesters having a high affinity for basic dyes and improved light fastness comprising a linear polyester modified with radicals containing at least one group selected from sulfonate, sulfinate, phosphonate, phosphinate and carboxylate groups in the form of a metal salt thereof and a minor amount of at least one aliphatic compound having a carbon to oxygen double bond or a carbon to carbon double bond conjugated with another carbon to carbon double bond.

---

This invention relates to an improved polyester, particularly a film- or fiber-forming polyester capable of being dyed with basic dyes to a high dye fastness to light.

Generally, film- or fiber-forming polyesters, represented, for instance, by polyethylene terephthalate, have various excellent properties, but at the same time have the defect that they are difficult to dye, and especially have hardly any affinity for basic dyes which are low in dyeing cost and give brilliant colors. For meeting such situation, there have already been proposed modified polyesters having a high affinity for basic dyes. It has however been found that these modified polyesters have low dye light fastness when dyed with basic dyes, and such defect has not yet been completely eliminated. Basic dye light fastness on basic dyeable polyester fibers is inferior to that on basic dyeable acrylic fibers.

We have now found that the aforesaid defect can be removed by combining a small amount of a specific constituent into the polyester structure in the manufacture of the modified polyesters. Accordingly, an object of the present invention is to provide improved film- or fiber-forming polyesters which can be dyed well with basic dyes to give dyeings very fast to light.

The foregoing known modified polyesters having a high affinity for basic dyes are disclosed in detail in U.S. Pats. 3,018,272, 3,052,653, 3,507,826, 3,057,827 and 3,077,492, British Patents 826,248 and 856,917, and Japanese Patent Publications Nos. 10497/59, 18550/61, 6748/62, 11442/62, 14838/64, 23096/64 and 24296/64. In these modified polyesters, organic radicals containing at least one of sulfonate, sulfinate, phosphonate, phosphinate and carboxylate groups in the form of a metal salt constitute a minor portion of the structural units of the polyester. The organic radicals are usually introduced into the structure of the polyester during a polymerization step to produce the polyester. Thus, the said modified polyesters can be prepared by effecting the ester-forming polymerization reaction of the main components to constitute a major portion of the structural units of the polyester in the presence of a small amount of a compound containing at least one ester-forming functional group together with at least one aforesaid acid group in the form of a metal salt, the metal in the metal salt being sodium, potassium, lithium, calcium, barium, lead or lanthanum. An amount of the minor constituent is at least 0.5 mol percent, preferably 2–5 mol percent, based on the total of the acidic components of the polyester. Several typical examples of the compounds used as such minor constituent are as follows:

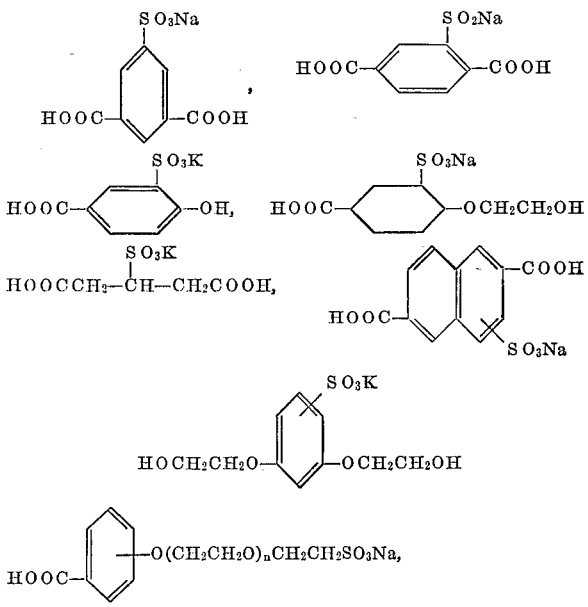

and the ester-forming derivatives of these compounds.

On the other hand, the ester units which constitute a major part of the structure of the polyester are esters formed by condensation between aromatic dicarboxylic acids or ester-forming functional derivatives thereof and polymethylene glycol, or esters formed by self-condensation of aromatic oxycarboxylic acids or ester-forming derivatives thereof. Depending upon the type of the carboxylic acid component used, polyesters having etheric oxygen in their molecule, i.e., so-called polyetheresters, are sometimes formed, but such polyetheresters also fall into the category of polyester. Some typical examples of the aromatic dicarboxylic acids and aromatic oxycarboxylic acids are as follows:

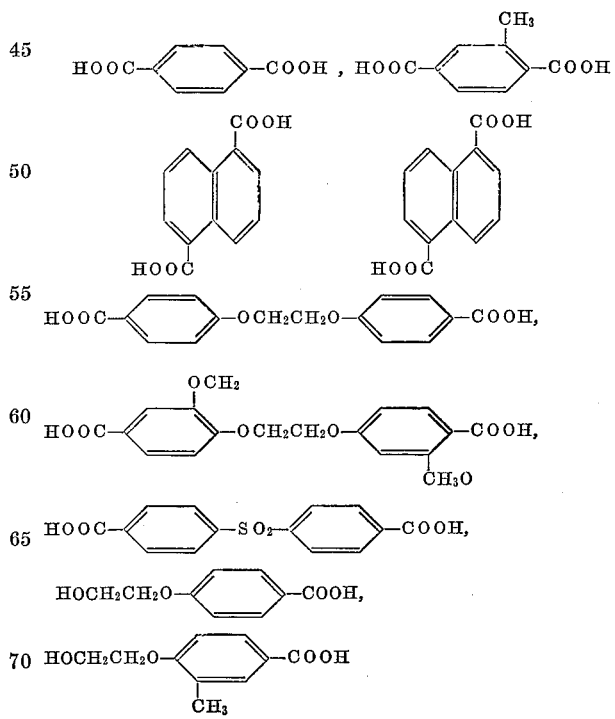

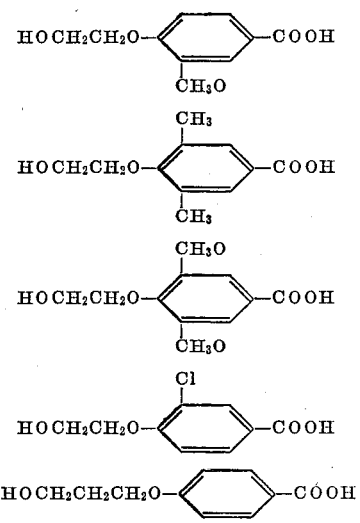

The invention will now be described in greater detail.

The process of the present invention comprises conducting the reaction of forming the above-mentioned known modified polyesters, in the copresence of a small amount of at least one compound selected from the class consisting of:

(a) An aliphatic compound containing at least two ethylenic

groups which are conjugated to each other, together with at least one ester-forming functional group, (b) An aliphatic compound containing at least one group of the formula

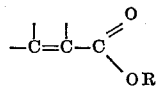

wherein R is a hydrogen atom or a lower alkyl group, optionally together with other ester-forming functional group, and (c) An aliphatic compound containing at least one group of the formula

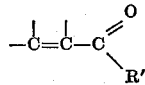

wherein R' is a lower alkyl group, together with at least one ester-forming functional group, thereby copolymerizing said compound as minor units in the polyester to form a polyester having much improved basic dye fastness to light.

The above-mentioned compounds (a), (b) and (c) are characteristic in that they contain in their molecule

—C=C— group or —C=O group conjugated to —C=C— group. For simplification, these compounds will hereinafter be called "light fastness improving comonomer" or merely "comonomer." The lower alkyl appearing in the present description means an alkyl group having 1–4 carbon atoms. The said ester-forming functional group includes a hydroxyl group and an ester group of it with a lower fatty acid; a carboxyl group and an ester group of it with of it with a lower alcohol; and an acid anhydride group derived from dicarboxylic acids. Comonomer (b), as is shown by the formula, has a carboxyl group which serves as the ester-forming functional group, but may further contain an ester-forming functional group.

It is preferable that the number of —C=C— groups in the comonomer should not exceed 5 and that of

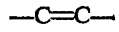

group should not be in excess of 3 because of discoloration of resulting polymer. Furthermore, the carbon atom of the unsaturated bond preferably has a lower alkyl group as a side chain, because the unsaturated bond is reduced in reactivity and a tendency of gelation during polymerization is much decreased.

Specific examples of the comonomers (a), (b) and (c) include the following.

Maleic acid, citraconic acid, fumaric acid, mesaconic acid, itaconic acid, dimethyl itaconic acid, dimethyl citraconic acid, ethyl citraconic acid, glutaconic acid, cis-β-methyl glutaconic acid, γ-butylene-α,γ-dicarboxylic acid, α-butylene-α, δ-dicarboxylic acid, crotonic acid, sorbic acid, α,β-hexenoic acid, α-methoxymethyl acrylic acid, β-acetyl acrylic acid, δ-oxy-γ,γ-dimethyl-α-butylene-α-carboxylic acid, α,α'-dimethylmuconic acid, muconic acid, 2,4-hexadiene-1,6-dicarboxylic acid, 1,6-dimethyl-1,3,5-hexatriene-1,6-dicarboxylic acid, 1,8-dimethyl-1,3,5,7-octatetraene-1,8-dicarboxylic acid, 2,4-hexadiene-1,6-diol, esters of said carboxylic acids with lower alcohols, esters of said alcohols with lower fatty acids, and acid anhydrides of said carboxylic acids. Of these, α,α'-dimethylmuconic acid and its dialkyl esters are most preferably used.

The comonomer can be added before or during the polymerization. For the comonomer to be copolymerized with good efficiency and to contribute fully to the improvement of light fastness, however, it is desirably added in a stage before the middle of the polymerization step. Amounts of the comonomer are as small as 0.1–20 mol percent based on an amount of the dicarboxylic acid or oxycarboxylic acid as the main constituent of the polyester. Amounts in excess of 20 mol percent are likely to affect the physical properties, particularly the mechanical strength, of the product adversely. Especially preferable amounts of the comonomer to be added range from 0.5 mol percent to 10 mol percent.

When the comonomer is a dicarboxylic acid or its dialkyl ester, it may be added in the form of a polymer or prepolymer formed by reaction with a diol. If the comonomer is an oxy acid, it can be added in the form of its homopolymer or copolymer. Furthermore, if the comonomer is a diol, it may be added in the form of a polymer or copolymer obtained by reaction with a dicarboxylic acid or its derivative.

The comonomer or a prepolymer or polymer consisting predominantly of the comonomer can be added in any form such as solid, melt and solution in an inert solvent.

The esterification reaction, ester-interchange reaction and polymerization reaction are conducted in accordance with a customary method. Melt-polymerization method is preferably used as the polymerization procedure. As is well known, these reactions may be carried out in the presence of an esterification or ester-interchange reaction catalyst such as zinc diacetate, manganese diacetate, calcium diacetate, cobalt diacetate, zinc acetyl acetonate, and cobalt dichloride, a polymerization catalyst such as antimony trioxide, germanium dioxide, antimony triacetate, antimony glycoloxide, sodium antimonate, antimony trichloride, germanium tetrachloride and titanium tetraethoxide, a stabilizer such as trimethyl phosphate, trimethyl phosphite, trisodium phosphate, triethyl phosphate, triphenyl phosphate and triphenyl phosphite, a delustrant such as titanium dioxide, a chain branching agent such as pentaerythritol, or other conventional additives. As a matter of course, the reaction is carried out in the copresence of the metal salt as hereinabove described, which is a modifier for imparting affinity for basic dyes to the polyester.

Large amounts of comonomer or prolonged polymerization often causes gelation and discoloration of the polymerization mass. Thus, it is generally preferable to stop the polymerization for a short period of time when the degree of polymerization reaches a sufficient level that gives the polymerizing mass fiber or film forming properties.

The polyesters obtained by the process of the present invention can be formed into fibers or films, which can be dyed with basic dyes. The obtained dyeings have very high fastness to light owing to the presence of the co-monomer constituent in the polyester structure. The comonomer constituent could even give the polyester an increased affinity for basic dyes. By the basic dyes used herein are meant dyes classified as basic dyes in Colour Index, 2nd edition (1956) edited by Society of Dyers and Colourists and American Association of Textile Chemists and Colorists.

The invention will further be described by the following examples, in which all parts are parts by weight, and the intrinsic viscosity ($\eta$) is a value (dl./g.) measured in a 1:1 mixed solvent of phenol and tetrachloroethane at 30° C. In the following examples, the dye bath contained 10% O.W.F. of sodium sulfate and 0.3% O.W.F. of acetic acid for achieving level dyeing. The dye light fastness was measured after soaping the dyed filaments with a warm water bath containing a detergent. The fastness to light is a fastness on a blue scale measured in accordance with the Japanese Industrial Standard L 1044 (same as ASTM 16A-56) using a xenon lamp as a light source. The fastness was rated by grades ranging from 1 (weakest) to 8 (excellent).

EXAMPLE 1

Two hundred (200) parts of dimethyl terephthalate, 8 parts of dimethyl 5-sodiumsulfoisophthalate, 200 parts of ethylene glycol and 0.1 part of zinc diacetate were heated to 190° C. and stirred. While removing methanol formed as by-product, the reaction was conducted for 2 hours at this temperature. Thereafter, 0.08 part of trimethyl phosphate, 0.1 part of antimony trioxide and 3 parts of $\alpha,\alpha'$-dimethyl muconic acid were added. The reaction system was gradually heated and reduced in pressure, and the polymerization was conducted for two hours at 275° C. and 1.0–0.8 mm. Hg. The so obtained polymer was immediately melt-spun from a spinneret located below the reactor, drawn and heat-treated thereby to give a white polyester filament having a melting point of 251° C. and an [$\eta$] of 0.53.

The obtained filament was dyed with a basic dye, Sevron Brilliant Red B (2.0% O.W.F. liquor to fiber ratio of 50:1, 120° C.) to give a deep red dyeing which had a fastness to light rated as grade 5.

For comparison, the foregoing procedure was repeated without adding $\alpha,\alpha$-dimethyl muconic acid. There was obtained a deep red dyeing, which however had a light fastness rated as grade 2.

EXAMPLE 2

Two hundred (200) parts of dimethyl terephthalate, 10 parts of dimethyl isophthalate, 12 parts of dimethyl 5-sodium sulfoisophthalate, 250 parts of ethylene glycol, and 0.15 part of manganese diacetate were heated to 190° C. and stirred. While removing methanol formed as by-product, the reaction was conducted for 2 hours at this temperature. Thereafter, 0.08 part of trimethyl phosphite and 0.15 part of antimony trioxide were added. The mixture was pre-polymerized for 30 minutes at 240° C. and 200 mm. Hg. Thereafter, the pressure was returned to normal atmospheric pressure by supplying nitrogen gas, and 5 parts of $\alpha,\alpha'$-dimethyl muconic acid was added. The system was gradually heated and reduced in pressure, and the polymerization was conducted for 1.5 hours at 270° C. and 1 mm. Hg. The obtained polymer was immediately melt-spun, drawn and heat-treated thereby to give a white filament having a melting point of 247° C. and an [$\eta$] of 0.49.

The filament was dyed with a basic dye, Astrazon Orange G (2.0% O.W.F., liquor to fiber ratio of 50:1, 110° C.) to give a deep orange dyeing which had a fastness to light rated as grade 6 to 7.

For comparison, the foregoing procedure was repeated without adding $\alpha,\alpha'$-dimethyl muconic acid. There was obtained a deep orange dyeing, which however had a light fastness rated as grade 3.

EXAMPLE 3

Two hundred (200) parts of terephthalic acid, 12 parts of 3-sodium sulfo - 4 - ($\beta$ - hydroxyethoxy) benzoic acid, 200 parts of ethylene glycol, 4 parts of muconic acid and 0.1 part of trisodium phosphate were reacted for 1.5 hours at 250° C. and 2.8–3.3 kg./cm.$^2$. G, while removing water formed as by-product together with a small amount of ethylene glycol. Thereafter, the pressure was returned to normal atmospheric pressure, and a solution of 0.15 part of germanium dioxide in ethylene glycol was added. The system was gradually heated and reduced in pressure, and the polymerization was conducted for 2 hours at 270° C. and 1 mm. Hg. The obtained polymer was immediately shaped into cylindrical chips each having a length of 1 mm. and a diameter of 1 mm. The chips were dried, and melt-spun through a melt-extruder, followed by drawing and heat-treatment, thereby to give a filament having a melting point of 250° C. and an [$\eta$] of 0.50.

The obtained filament was dyed with a basic dye, Basacryl Blue GL (3.0% O.W.F., liquor to fiber ratio of 50:1, 115° C.) to give a deep blue dyeing which had a light fastness rated as grade 6.

For comparison, the foregoing procedure was repeated without adding muconic acid. There was obtained a deep blue dyeing, which however had a light fastness rated as grade 3.

EXAMPLE 4

Two hundred (200) parts of dimethyl terephthalate, 10 parts of dimethyl 5-sodium sulfoisophthalate, 200 parts of ethylene glycol, 2.5 parts of sorbic acid, 0.5 part of pentaerylthritol and 0.1 part of zinc diacetate were heated to 185° C. and stirred. While removing methanol formed as by-product, the reaction was carried out for 2 hours at this temperature. Thereafter, 0.15 part of triphenyl phosphite, 0.1 part of antimony trioxide and 10 parts of ethylene glycol were added, and the system was gradually heated and reduced in pressure. The polymerization was conducted for 1.5 hours at 280° C. and 1.0–0.7 mm. Hg. The obtained polymer was immediately melt-spun, drawn and heat-treated thereby to give a white filament having a melting point of 257° C. and an ($\eta$) of 0.51.

The obtained filament was dyed with a basic dye, Sevron Blue B (2.0% O.W.F., liquor to fiber ratio of 50:1, 120° C.) to give a deep blue dyeing, which had a light fastness rated as grade 3.

For comparison, the foregoing procedure was repeated except that sorbic acid or additionally pentaerythritol was not added and the polymerization time was varied to provide an ($\eta$) of 0.50 to 0.52. The obtained filaments were dyed deep blue, but their fastness to light was rated only as grade 2.

EXAMPLE 5

Two hundred and fifty (250) parts of dimethyl 2,6-naphthalene dicarboxylate, 8 parts of dimethyl 5-sodium sulfoisophthalate, 150 parts of ethylene glycol, 6 parts of 2,4-hexadiene-1,6-diol and 0.15 part of zinc diacetate were heated to 180° C. and stirred. While removing methanol formed as by-product, the reaction was conducted for 2 hours at this temperature. Thereafter, 0.15 part of triphenyl phosphate, 0.1 part of antimony triacetate and 10 parts of ethylene glycol were added, and the system was gradually heated and reduced in pressure. The polymerization was conducted for 1.5 hours at 270° C. and 1.1–0.8 mm. Hg. The obtained polymer was immediately spun from a spinneret located below the reactor, drawn and heat-treated thereby to give a white filament having a melting point of 243° C. and an ($\eta$) of 0.50.

The obtained filament was dyed with a basic dye, Astrazon Orange R (3.0% O.W.F., liquor to fiber ratio of 50:1, 98° C.) to give a deep orange dyeing which had a light fastness rated as grade 5.

For comparison, the foregoing procedure was repeated except that 2,4-hexadiene-1,6-diol was not added. The obtained filament was dyed in orange, and the dyeing had a fastness to light rated as grade 3.

EXAMPLE 6

Two hundred (200) parts of dimethyl terephthalate, 20 parts of dimethyl α,α'-dimethyl muconate, 120 parts of ethylene glycol, 0.1 part of zinc diacetate and 0.2 part of titanium dioxide were heated to 190° C. and stirred. While removing methanol formed as by-product, the reaction was carried out for 1.5 hours at this temperature. Thereafter, 0.1 part of trimethyl phosphate and 0.1 part of antimony trioxide were added, and the system was gradually heated and reduced in pressure. The polymerization was performed for 1.5 hours at 270° C. and 1.0–0.6 mm. Hg. The obtained polymer was withdrawn as chips (to be referred to as chip A).

On the other hand, 200 parts of dimethyl terephthalate, 15 parts of dimethyl 5-sodium sulfoisophthalate, 120 parts of ethylene glycol and 0.1 part of manganese diacetate were heated to 190° C. and stirred. While removing methanol formed as by-product, the reaction was carried out for 1.5 hours. Thereafter, 0.1 part of trimethyl phosphate and 0.1 part of antimony trioxide were added, and the system was gradually heated and reduced in pressure. The polymerization was conducted for 1.5 hours at 275° C. and 1.0–0.7 mm. Hg. The obtained polymer was withdrawn as chips (to be referred to as chip B).

Chip A and chip B were thoroughly mixed, and after drying the mixture was melt-spun through an extruder-type spinning apparatus. The extruded filament was then drawn and heat-treated to give a white filament having a melting point of 249° C. and an ($\eta$) of 0.49.

When the resulting filament was dyed with a basic dye of various kinds (2.0% O.W.F., liquor to fiber ratio of 50:1, 120° C.), it was dyed in deep color and had a light fastness of the ratings shown in Table 1 below.

For comparison, the foregoing procedure was repeated without using dimethyl α,α'-dimethyl muconate. The obtained filaments were dyed in deep color. The light fastness ratings of the obtained dyeings are also shown in Table 1.

TABLE 1

| Basic dyes | Fastness to light (grade) | |
| --- | --- | --- |
| | Example 6 | Comparison |
| Sevron Brilliant Red B | 4 | 3 |
| Basacryl Blue GL | 6 | 4 |
| Astrazon Orange RRL | 6 | 4 |
| Astrazon Blue B | 3 | 2 |
| Astrazon Red BBL | 6 | 4 |
| Sevron Blue 5G | 4 | 3 |
| Sevron Yellow R | 7 | 5 |
| Sevron Green B | 3 | 1 |
| Basacryl Violet RL | 4 | 3 |

EXAMPLE 7

Two hundred (200) parts of dimethyl terephthalate, 10 parts of dimethyl 5-sodium sulfoisophthalate, 160 parts of ethylene glycol, 3 parts of dimethyl maleate and 0.1 part of zinc diacetate were heated to 180° C. and stirred. While removing methanol formed as by-product, the reaction was conducted for 2 hours at this temperature. Thereafter, 0.08 part of trimethyl phosphate, 0.1 part of antimony trioxide and 5 parts of ethylene glycol were added, and the system was gradually heated and reduced in pressure. The polymerization was effected for one hour at 270° C. and 1.0–0.8 mm. Hg. The obtained polymer was melt-spun from a spinneret located below the reactor, drawn and heat-treated to give a slightly yellowish, white filament having a melting point of 256° C. and an [$\eta$] of 0.53.

The obtained filament was dyed with a basic dye, Sevron Brilliant Red B (3.0% O.W.F., liquor to fiber ratio of 50:1, 120° C.) to give a deep red dyeing which had a fastness to light rated as grade 4.

For comparison, the foregoing procedure was repeated without adding dimethyl maleate. The obtained filament was dyed in deep red, and the dyeing had a fastness to light rated as grade 2.

EXAMPLE 8

Two hundred (200) parts of dimethyl terephthalate, 20 parts of dimethyl isophthalate, 10 parts of dimethyl 5-potassium sulfoisophthalate, 160 parts of ethylene glycol, 3 parts of dimethyl itaconate, 0.05 part of manganese diacetate and 0.05 part of cobalt diacetate were heated to 185° C. and stirred. While removing methanol formed as by-product, the reaction was carried out for 1.5 hours at this temperature. Thereafter, 0.1 part of triethyl phosphate, 0.1 part of germanium dioxide and 10 parts of ethylene glycol were added, and the system was gradually heated and reduced in pressure. The polymerization was performed for 1.5 hours at 275° C. and 1.0–0.8 mm. Hg. The obtained polymer was immediately melt-spun, drawn and heat-treated to give a white filament having a melt point of 231° C. and an [$\eta$] of 0.51.

The obtained filament was dyed with a basic dye, Astrazone Orange G (2.0% O.W.F., liquor to fiber ratio of 50:1, 110° C.) to give a deep orange dyeing having a fastness to light rated as grade 6.

For comparison, the foregoing procedure was repeated without adding dimethyl itaconate. The obtained filament was dyed in deep orange, but the dyeing had a light fastness rated as grade 3.

EXAMPLE 9

Two hundred (200) parts of terephthalic acid, 200 parts of ethylene glycol and 0.1 part of trisodium phosphate were reacted for one hour at 250° C. and 2.8–3.3 kg./cm.² G while removing water formed as by-product together with a small amount of ethylene glycol. While excess ethylene glycol was being removed by distillation, the pressure of the reaction system was returned to normal atmospheric pressure. Twelve (12) parts of 3-sodium sulfo-4-(β-hydroxyethoxy) benzoic acid, 6 parts of δ-oxy-γ,γ-dimethyl-α-butylene-α-carboxylic acid, 0.1 part of antimony trioxide and 0.5 part of titanium dioxide were added together with 20 parts of ethylene glycol. While gradually heated and reduced in pressure, the polymerization was finally conducted for one hour at 280° C. and 1.0–0.7 mm. Hg. The obtained polymer was immediately melt-spun, drawn and heat-treated to give a white filament having a melting point of 251° C. and an [$\eta$] of 0.48.

The obtained filament was dyed with a basic dyestuff, Basacryl Blue GL (3.0% O.W.F., liquor to fiber ratio of 50:1, 98° C.) to give a deep blue dyeing which had a fastness to light rated as grade 5.

For comparison, the foregoing procedure was repeated without adding δ-oxy - γ,γ - dimethyl-α-butylene-α-carboxylic acid. The obtained filament was dyed blue, but the dyeing had a fastness to light rated as grades 3–4.

EXAMPLE 10

Two hundred (200) parts of dimethyl terephthalate, 10 parts of dimethyl 5-sodium sulfoisophthalate, 200 parts ethylene glycol, and 0.1 part of zinc diacetate were heated to 195° C. and stirred. While removing methanol formed as by-product, the reaction was carried out for 1.5 hours at this temperature. Thereafter, 1.5 parts of α,β-hexenoic acid, 0.3 part of pentaerythritol, 0.15 part of triphenyl phosphite, 0.1 part of antimony trioxide and 20 parts of ethylene glycol were added, and the system was gradually heated and reduced in pressure after a lapse of 15 minutes. The polymerization was finally conducted for 1 hour at 275° C. and 1.0–0.8 mm. Hg. The obtained polymer was immediately melt-spun, drawn and heat-treated to give a filament having a melting point of 258° C. and an [η] of 0.53.

The obtained filament was dyed with Sevron Blue B (2.0% O.W.F., liquor to fiber ratio of 50:1, 120° C.) to give a deep blue dyeing which had a fastness to light rated as grade 3.

For comparison, the foregoing procedure was repeated except that α,β-hexenoic acid or additionally pentaerythritol was not added and the polymerization time was adjusted to provide an [η] of 0.51–0.55. The obtained filaments were dyed in deep blue, but the dyeings had a light fastness rated as grade 2.

EXAMPLE 11

Two hundred and fifty (250) parts of dimethyl 2,6-naphthalene dicarboxylate, 8 parts of dimethyl 5-sodium sulfoisophthalate, 150 parts of ethylene glycol, and 0.1 part of zinc diacetate were heated to 190° C. and stirred. While removing methanol formed as by-product, the reaction was carried out for 1.5 hours at this temperature. Thereafter, a solution of 0.08 part of trimethyl phosphate and 0.1 part of germanium dioxide in ethylene glycol was added, and the system was gradually heated and reduced in pressure. The mixture was pre-polymerized for 30 minutes at 270° C. and 15 mm. Hg. Thereafter, a pre-polymer which had been obtained by reacting 3 parts of maleic anhydride and 3 parts of ethylene glycol for 30 minutes at 70° C., 30 minutes at 190° C. and further one hour at 220° C. was added to the reaction system, and the reaction pressure of the system was gradually reduced. The polymerization was conducted finally for 80 minutes at 270° C. and 1 mm. Hg. The obtained polymer was immediately melt-spun from a spinneret located below the reactor, drawn and heat-treated to give a filament having a melting point of 252° C. and an [η] of 0.53.

The obtained filament was dyed with a basic dye, Astrazon Orange R (3.0% O.W.F., liquor to fiber ratio of 50:1, 110° C.) to give a deep orange dyeing which had a fastness to light rated as grade 4.

For comparison, the foregoing procedure was repeated without adding a prepolymer from maleic anhydride and ethylene glycol. The obtained filament was dyed orange, but the dyeing had a light fastness rated as grades 2–3.

EXAMPLE 12

Two hundred (200) parts of dimethyl terephthalate, 8 parts of dimethyl itaconate, 120 parts of ethylene glycol and 0.08 part of zinc diacetate were heated to 170° C. and stirred. While removing methanol, the reaction was conducted for one hour. The reaction system was gradually heated and reduced in pressure, and the polymerization was performed for 40 minutes at 260° C. and 1.0–0.8 mm. Hg. The obtained polymer was withdrawn as chips (to be referred to as chip A).

On the other hand, 200 parts of dimethyl terephthalate, 18 parts of dimethyl 5-sodium sulfoisophthalate, 150 parts of ethylene glycol, and 0.1 part of zinc diacetate were heated to 190° C. and stirred. While removing methanol formed as by-product, the reaction was carried out for 1.5 hours at this temperature. Thereafter, the system was gradually heated and reduced in pressure, and the polymerization was conducted for 1.5 hours at 275° C. and 1.0–0.8 mm. Hg. The obtained polymer was withdrawn as chips (to be referred to as chip B).

Chip A and chip B were well mixed, and after drying, melt-spun by an extruder-type spinning apparatus, drawn and heat-treated to give a filament having a melting point of 245° C. and an [η] of 0.51.

The obtained filament was dyed respectively with Sevron Brilliant Red B, Sevron Blue 5G, Sevron Yellow R, and Basacryl Violet RL (2.0% O.W.F., liquor to fiber ratio of 50:1, 120° C.) to give a deep color dyeing which had a fastness to light rated as grade 4, grade 5, grades 6–7, and grade 4, respectively.

For comparison, the foregoing procedure was repeated without adding dimethyl itaconate. The obtained filaments were dyed in deep color, but the obtained dyeings had a light fastness rated respectively as grade 3, grade 3, grade 5, and grade 3.

EXAMPLE 13

Two hundred (200) parts of methyl p-(β-oxyethoxy) benzoate, 7 parts of dimethyl 5-sodium sulfoisophthalate, 0.1 part of zinc diacetate, 0.1 part of antimony trioxide, 0.4 part of titanium dioxide and 7 parts of methyl δ-oxy-γ,γ-dimethyl-α-butylene-α-carboxylate were charged into a reactor, and heated for one hour at 180° C. under stirring. While continuously removing methanol formed as by-product, the reaction system was heated gradually to 250° C. and the reaction was continued for one hour at this temperature. Thereafter, the pressure was gradually reduced, and the polymerization was finally conducted for 5 hours at 250° C. and 1.0–0.7 mm. Hg. The so obtained white polymer having a melting point of 210° C. and an [η] of 0.47 was immediately melt-spun from a spinneret located below the reactor, drawn in a customary manner in a water bath to 4 times the original length, and heat-treated at 120° C. to get a filament.

The obtained filament was dyed with three basic dyes indicated in Table 2 below to give a deep color dyeing. The fastness to light of the obtained dyeings is shown in Table 2.

For comparison, the foregoing procedure was repeated without adding methyl δ-oxy-γ,γ-dimethyl-α-butylene-α-carboxylate. The obtained filaments were dyed in deep color, but the light fastness of the obtained dyeings was low. The results are also shown in Table 2.

TABLE 2

| Basic dyes | Fastness to light (grade) | |
|---|---|---|
| | Example 13 | Comparison |
| Sevron Brilliant Red B | 4 | 2–3 |
| Basacryl Blue GL | 4–5 | 3 |
| Astrazon Orange RRL | 5–6 | 4 |

The dyeing conditions are as follows: dye concentration, 2.0% O.W.F.; liquor to fiber ratio, 50:1; dyeing temperature, 110° C.; dyeing time, 2 hours.

EXAMPLE 14

Two hundred (200) parts of methyl p-(β-oxyethoxy) benzoate, 6 parts of methyl 3-potassium sulfo-4-(β-hydroxyethoxy) benzoate, 0.1 part of zinc diacetate and 0.1 part of antimony trioxide were charged into a reactor, and heated for one hour at 200° C. and stirred. While removing methanol formed as by-product continuously, the system was gradually heated to 220° C. and 2 parts of α,α'-dimethyl muconic acid was added to the reaction system. After a lapse of 20 minutes, the system was gradually heated and reduced in pressure, and the polymerization was conducted for 6 hours at 260° C. and 1 mm. Hg. The obtained white polymer having a melting point of 213° C. and an [η] of 0.45 was immediately spun from a spinneret located below the reactor, drawn and heat-treated.

The obtained filament was dyed with five basic dyes in the same manner as in Example 13 to give deep color dyeings having a fastness to light rating shown in Table 3.

For comparison, the foregoing procedure was repeated without adding α,α'-dimethyl muconic acid. The obtained filament was dyed in deep color, but the resulting dyeings had a low light fastness as shown in Table 3.

TABLE 3

| Basic dyes | Fastness to light (grade) | |
|---|---|---|
| | Example 14 | Comparison |
| Sevron Brilliant Red 4G | 4 | 2–3 |
| Sevron Blue 5G | 4 | 3 |
| Basacryl Violet RL | 5 | 3 |
| Sevron Green B | 3 | 2 |
| Sumiacryl yellow 3R | 5 | 4 |

EXAMPLE 15

Two hundred (200) parts of p-(β-oxyethoxy) benzoic acid, 20 parts of α,α'-dimethyl muconic acid, 6 parts of pentaerythritol and 0.1 part of zinc diacetate were charged into a reactor, and heated to 200° C. and stirred. While removing water formed as by-product, the reaction was carried out for one hour at this temperature. The system was gradually heated and reduced in pressure, and the polymerization was finally polymerized for 5 hours at 250° C. and 1–0.7 mm. Hg. The obtained polymer was withdrawn as chips (to be referred to as chip A).

On the other hand, 200 parts of methyl p-(β-oxyethoxy) benzoate, 0.1 part of tetraisopropyl titanate, and 10 parts of dimethyl 5-sodium sulfoisophthalate were charged into a reactor, and heated to 200° C. and stirred. While removing methanol formed as by-product, the reaction was carried out for 1.5 hours at this temperature. The system was gradually heated and reduced in pressure, and the polymerization was finally conducted for 6 hours at 270° C. and 1–0.7 mm. Hg. The obtained polymer was withdrawn as chips (to be referred to as chip B).

Thirty (30) parts of chip A was mixed with 120 parts of chip B, and after drying, the mixture was melt-spun by an extruder-type spinning apparatus, drawn and heat-treated.

The obtained filament was dyed with a basic dye, Astrazon Red BBL in the same manner as in Example 13 to give a deep color dyeing having a light fastness rated as grade 6.

For comparison, a filament obtained from chip B was dyed with the same dye. It was dyed in deep color, but the dyeing had a light fastness rating of only grade 4.

EXAMPLE 16

Two hundred (200) parts of methyl 3-methoxy-4-(β-hydroxyethoxy) benzoate, 6 parts of methyl 3-sodium sulfo-4-(β-hydroxyethoxy) benzoate, and 0.1 part of zinc diacetate were charged into a reactor, and heated at 200° C. for one hour under stirring while removing methanol formed as by-product. Thereafter, a prepolymer obtained from 4.5 parts of dimethyl itaconate, 4 parts of ethylene glycol and 0.003 part of zinc diacetate was added, followed further by addition of 0.05 part of trimethyl phosphate and 0.1 part of antimony trioxide. The system was gradually heated and reduced in pressure, and the polymerization was finally conducted for 5 hours at 260° C. and 1 mm. Hg. The obtained polymer was withdrawn as chips. The obtained polymer chips were dyed at 98° C. with a basic dye, Sevron Brilliant Red B to give a deep color dyeing having a fastness to light rated as grades 3–4.

For comparison, the foregoing procedure was repeated without adding a prepolymer from dimethyl itaconate, ethylene glycol and zinc diacetate. The obtained polymer chips were dyed in deep color, but the resulting dyeing had a light fastness rating of only grade 2.

We claim:

1. A modified film- or fiber-forming polyester having a high affinity for basic dyes and improved light fastness consisting essentially of a linear polyester formed by the condensation polymerization of an aromatic dicarboxylic acid or ester-forming functional derivative thereof and a polymethylene glycol or the self-condensation polymerization of an aromatic oxycarboxylic acid or ester-forming derivative thereof, said polyester being modified during polymerization by the addition of:

(a) a compound containing at least one ester-forming functional group and at least one group selected from sulfonate, sulfinate, phosphonate, phosphinate and carboxylate groups in the form of a metal salt thereof; and (b) a minor amount of at least one compound selected from:

(1) aliphatic compounds having conjugated unsaturation and at least one ester-forming group selected from a carboxylic acid group and hydroxyl group, said aliphatic compound being selected from maleic acid, citraconic acid, fumaric acid, mesaconic acid, itaconic acid, dimethyl itaconic acid, dimethyl citraconic acid, ethyl citraconic acid, glutaconic acid, bis-β-methyl glutaconic acid, γ-butylene-α,γ-dicarboxylic acid, α-butylene-α,γ-dicarboxylic acid, crotonic acid, sorbic acid, α,β-hexanoic acid, α-methoxymethyl acrylic acid, β-acetyl acrylic acid, δ-oxo-γ,γ-dimethyl-α-butylene-α-carboxylic acid, α,α'-dimethylmuconic acid, muconic acid, 2,4-hexadiene-1,6-dicarboxylic acid, 1,6-dimethyl-1,3,5-hexatriene-1,6-dicarboxylic acid, 1,8-dimethyl-1,3,5,7-octatetraene-1,8-dicarboxylic acid and 2,4-hexadiene-1,6-diol;

(2) ester derivatives of said aliphatic compound of (1) wherein a carboxyl group is esterified with a lower alcohol;

(3) ester derivatives of said aliphatic compound of (1) wherein a hydroxyl group is esterified with a lower fatty acid; and (4) acid anhydrides of said aliphatic compound of (1).

2. The polyester of claim 1 wherein said aliphatic compound is present in an amount of 0.1 to 20 mol percent based on the aromatic dicarboxylic acid component or oxycarboxylic acid.

3. The polyester of claim 1 wherein said aliphatic compound is α,α'-dimethyl muconic acid or its dialkyl ester.

4. The polyester of claim 1 wherein said aliphatic compound is itaconic acid or its dialkyl ester.

5. The polyester of claim 1 wherein a major part of the structure of the polyester is ethylene terephthalate.

References Cited

UNITED STATES PATENTS

| 2,839,492 | 6/1958 | Caldwell et al. | 260—45.85 |
| 3,052,653 | 9/1962 | Iannicelli | 260—75 |
| 3,057,827 | 10/1962 | Griffing | 260—75 |
| 3,185,671 | 5/1965 | Horn | 260—75 |
| 3,429,949 | 2/1969 | Driscoll | 260—861 |

FOREIGN PATENTS

| 1,478,991 | 3/1967 | France. |
| 14,473 | 8/1967 | Japan. |
| 16,074 | 9/1967 | Japan. |

MELVIN GOLDSTEIN, Primary Examiner

U.S. Cl. X.R.

8—Dig. 4; 260—75 S, 75 UA, 78.3 UA

UNITED STATES PATENT OFFICE
CERTIFICATE OF CORRECTION

Patent No. 3,639,352      Dated February 1, 1972

Inventor(s) KATSURRA ET AL

It is certified that error appears in the above-identified patent and that said Letters Patent are hereby corrected as shown below:

Page 6, Claim 1, column 12, line 15, delete "bis-β-" and insert -- cis-β- --.

Signed and sealed this 6th day of June 1972.

(SEAL)
Attest:

EDWARD M. FLETCHER, JR.
Attesting Officer

ROBERT GOTTSCHALK
Commissioner of Patents